United States Patent [19]

Teraoka et al.

[11] 4,109,857

[45] Aug. 29, 1978

[54] AUTOMATIC UNIT PRICE SETTING APPARATUS OF ELECTRONIC DIGITAL DISPLAY SCALE WITH PRINTING DEVICE

[75] Inventors: Kazuharu Teraoka; Mitsuru Sato; Masao Mineo, all of Tokyo, Japan

[73] Assignee: Teraoka Seikosho Co., Ltd., Tokyo, Japan

[21] Appl. No.: 663,932

[22] Filed: Mar. 4, 1976

[30] Foreign Application Priority Data

Jul. 1, 1975 [JP] Japan .................................. 50-77916

[51] Int. Cl.² .................... G06K 15/02; G01G 23/38; G01G 19/04
[52] U.S. Cl. ........................................ 235/378; 177/4; 177/25
[58] Field of Search ................... 235/61.11 R, 61.9 R, 235/61.7 R, 61.6 R; 177/4, 26, 25

[56] References Cited

U.S. PATENT DOCUMENTS

| | | | |
|---|---|---|---|
| 3,789,193 | 1/1974 | Bremner | 235/61.11 R |
| 3,851,151 | 11/1974 | Stambera et al. | 235/61.9 R |
| 3,932,730 | 1/1976 | Ambrosio | 235/61.9 R |
| 3,961,747 | 6/1976 | Small et al. | 235/61.9 R |

*Primary Examiner*—Daryl W. Cook
*Attorney, Agent, or Firm*—Kane, Dalsimer, Kane, Sullivan & Kurucz

[57] ABSTRACT

An automatic unit price setting apparatus for an electronic digital display scale with a printing device in an equipment adapted to compute and display a price of an article of goods by multiplying a weight of said article to be weighed by a unit price of the article when the unit price is inputted in said scale and to print the name, weight, unit price and price of said article to be weighed, wherein one of a plurality of stamps for printing the names of articles engraved thereon is selectively connected with a unit price setting section of said electronic digital display scale so that said stamp and unit price setting section are electrically operated, and the unit prices of said articles indicated on said stamps are automatically set on the scale by operating said stamps.

14 Claims, 14 Drawing Figures

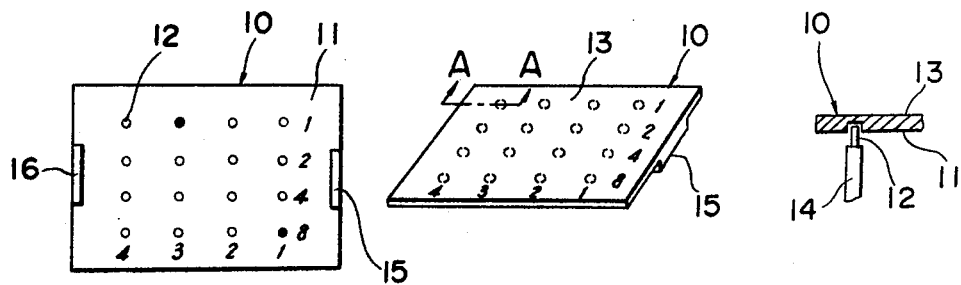
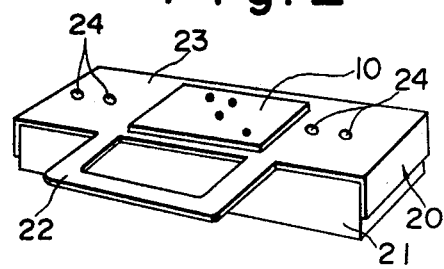
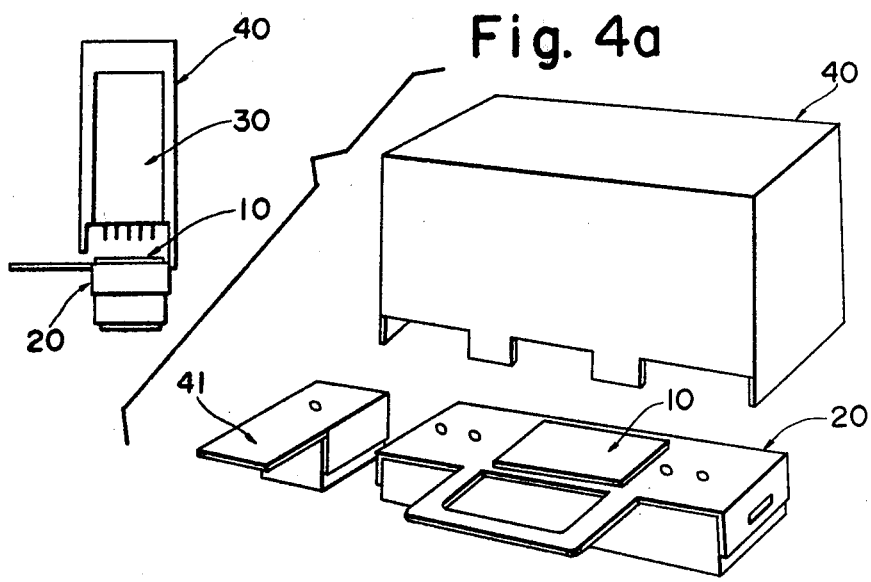

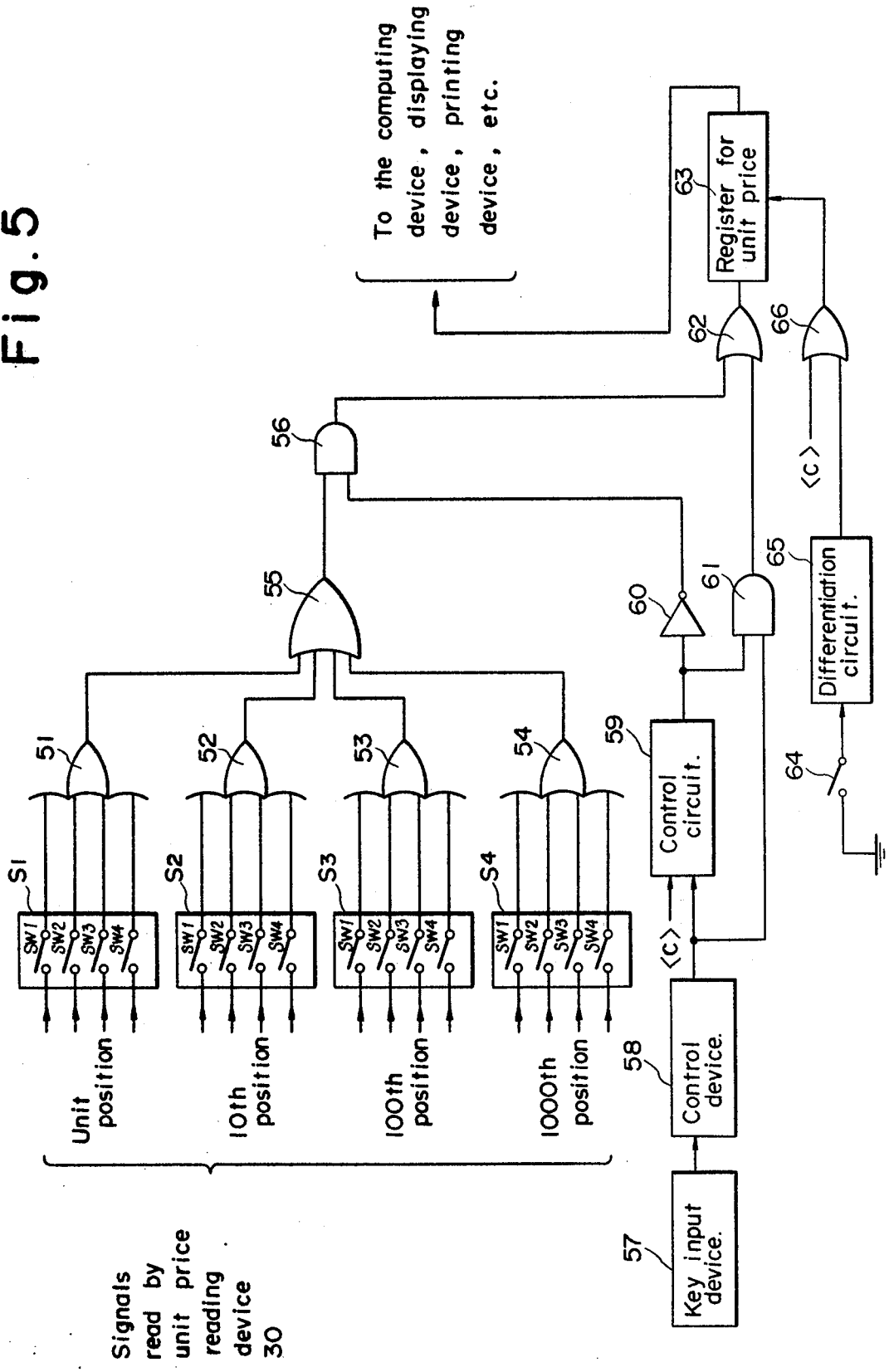

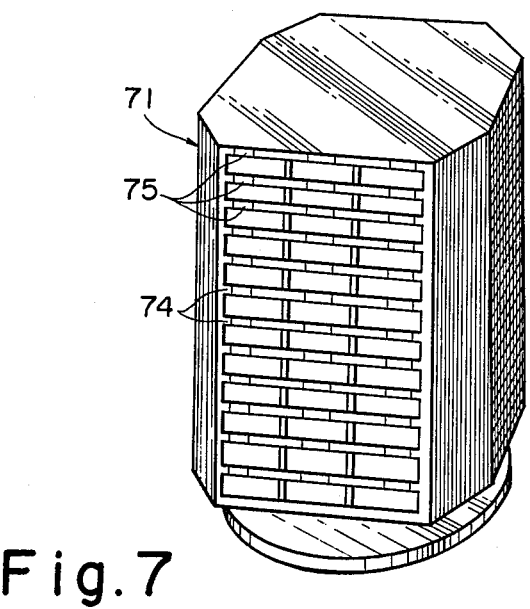
Fig. 6
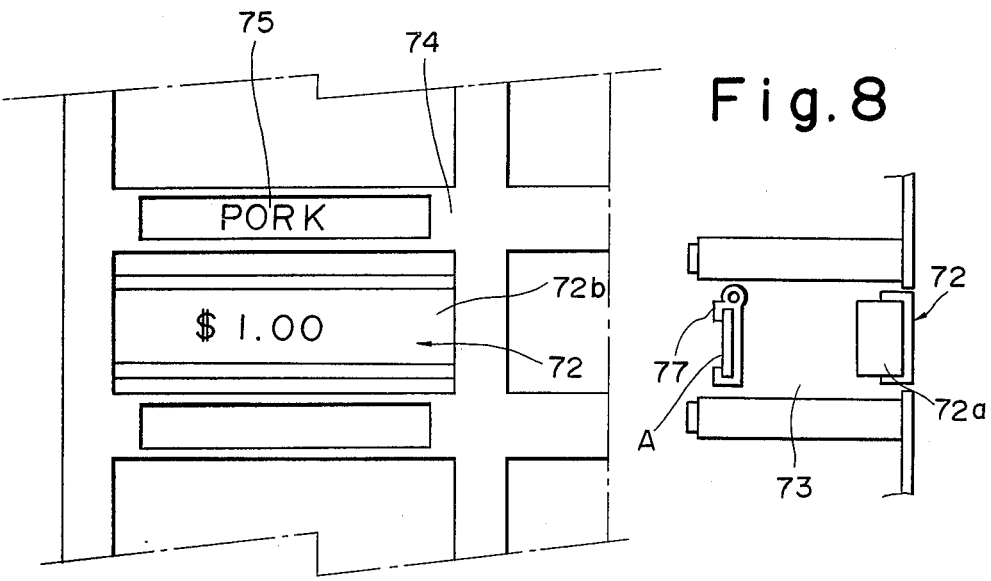
Fig. 7
Fig. 8

AUTOMATIC UNIT PRICE SETTING APPARATUS OF ELECTRONIC DIGITAL DISPLAY SCALE WITH PRINTING DEVICE

SUMMARY OF THE INVENTION

The present invention relates to an automatic unit price setting apparatus for an electronic digital display scale with a printing device adapted to weigh articles and print the names, weights, unit prices and prices of articles on labels, receipts, etc. wherein one of a plurality of stamps for printing the names of articles is selectively connected with a unit price setting section of said electronic digital display scale so that said stamp and unit price setting section are electrically operated, and the unit prices of articles which are indicated on said stamps can be automatically set in the electronic digital display scale.

Recently, various types of electronic digital display scales have been developed and widely used instead of conventional mechanical scales and balances. Moreover, electronic digital display scales provided with printing devices have also been developed in which the name, weight, unit price and price of a weighed article are printed on, for example, a label which is attached to the article when it is sold. To print the name of said article on a label or the like in the electronic digital display scale provided with the printing device as described above, stamps made of, for example, rubber for names of the articles to be weighed are separately provided and set at a specified position near said printing device; then the articles are weighed by the electronic scale and the names of articles together with measured weights are printed on labels or the like.

Conventionally in case of this type of apparatus, the unit prices of articles have been set in the electronic scale by operating the key input device for setting the unit prices of the electronic scales while observing the table containing the unit prices of articles and have been directly printed by the printing device. The prices of the articles to be sold have been printed on the labels on the like by automatically multiplying the weights measured on the electronic scale as described above by the unit price set as described above in the computing device of the electronic scale.

In case of setting the unit prices in the conventional electronic scale as described above, it is necessary to set the unit prices after confirming them on the unit price table since the unit prices differ with the articles. In this case, the unit price table may be misread and accordingly, a wrong unit price is set and a wrong price of an article is printed on a label, thus losing public confidence in a store or wasting the label due to reprinting of the price on a new label. As described above, the unit prices set in the electronic scale for the articles to be weighed should be erased when each article is weighed since the unit prices of articles vary and the unit price of an article to be subsequently weighed should be set in the electronic scale. Therefore the keyboard must be frequently operated for setting the unit prices of different articles, the unit price setting operation is troublesome and a long time is taken for setting the unit prices.

Furthermore, if the unit price of the preceding article is not erased and is left set in the scale, a wrong price is computed for a subsequent article.

The present invention is intended to improve the points described above to eliminate such disadvantages.

The first object of the present invention is to provide an automatic unit price setting apparatus for the electronic digital display scale with the printing device in an equipment adapted to compute and display a price of an article of goods by multiplying the weight of said article to be weighed by a unit price of the article when the unit price is set in said scale and to print the name, weight, unit price and price of said article to be weighed, wherein a stamp for printing the name of article on which the names of articles are engraved is connected with the unit price setting section of said electronic digital display scale so that these devices are electrically operated and the unit price of said article indicated on said stamp may be automatically set on the scale by operating said stamp.

The second object of the present invention is to provide an automatic unit price setting apparatus for the electronic digital display scale with the printing device wherein a number of unit price setting members, each containing the unit price of each article, which are prepared in advance, are respectively selected and set in the stamp for printing the name of article, the unit price of the article is automatically read and set in the electronic scale when said stamp is mounted in the unit price reading device, the price of the weighed article is computed by multiplying the weight measured when the article is put on the electronic scale by the unit price set as described above, the name of article is printed by the stamp for printing the name, weight, unit price and price of the article by the printing device simultaneously or continuously on a label(s) or receipt(s), by replacing said unit price setting member and stamp and performing similar operation when another article is weighed; thus the setting of the unit price is made easy and positive and the setting time can be reduced.

The third object of the present invention is to provide an automatic unit price setting apparatus for the electronic digital display scale with the printing device for which a number of stamps, each containing the unit price of each article, are prepared in advance and a stamp storing case which stores said stamps is provided also in advance, wherein an electric signal generating source which generates an electric signal when a stamp is taken out from the stamp storing section is provided in said stamp storing section, a memory which memorizes the unit price of said stamp in the address designated by the signal outputted from said electric signal generating source is provided, the unit price of the article is read out from the memory when the stamp is taken out from the stamp storing section of the stamp storing case for weighing the article and is automatically set in the electronic scale, the weight of the article measured when the article is put on the plate of the electronic scale and the unit price set as described above are multiplied in the electronic scale, the name of article is printed by the stamp for printing the name of article and the weight, unit price and price of the article by the printing device simultaneously or continuously on a label(s) or receipt(s), and taking out a stamp from said stamp storing case and performing simillar operation when another article is weighed, thus the setting of the unit price is made easy and positive and the setting time can be reduced.

BRIEF DESCRIPTION OF THE DRAWINGS

FIG. 1 shows a first embodiment of the present invention; FIG. 1(a) is a perspective view of the unit price setting member, FIG. 1(b) is a sectional view along A—A of FIG. 1(a) and FIG. 1(c) is a bottom view of said unit price setting member, FIG. 2 is a perspective view of the stamp for printing the names of articles on which said unit price setting members are mounted shown in said embodiment, FIG. 4(a) shows a disassembled view of the stamp for printing the name of article on which the unit price setting member shown in said embodiment is mounted, unit price reading device, casing etc. and FIG. 4(b) shows an assembled view of these devices, FIG. 5 shows a control circuit diagram for setting the unit price in the electronic scale shown in said embodiment, FIG. 6 is a general view of the stamp storing case in accordance with the second embodiment of the present invention, FIG. 7 is a partly magnified view of said stamp storing case, FIG. 8 is a partial sectional view of said stamp storing case of which the storing section stores the stamps for printing the names of articles shown in said embodiment.

DETAILED DESCRIPTION

Figure 3A:
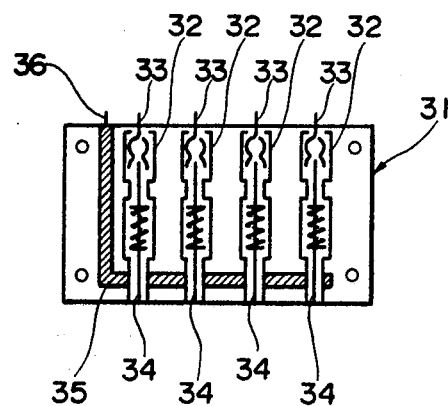
FIG. 3(a) is a plan view of the unit price reading plate forming the unit price reading device shown in said embodiment and FIG. 3(b) is a perspective view of the unit price reading device.
Figure 3B:
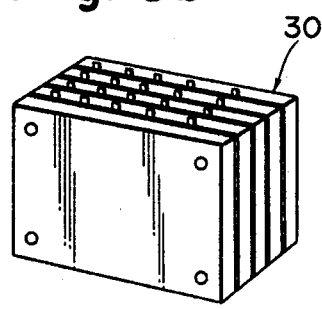

Referring to the drawings shown in FIGS. 1 to 5, the following describes in detail the first embodiment of the present invention. In FIG. 1, there is shown a unit price setting plate (unit plate setting member) 10 made of a rectangular thin plate shown. Unit setting plate 10 is made of, for example, an inexpensive, consumable synthetic resin plate. A specified number of non-through holes 12 are provided in a matrix arrangement with specified intervals on rear surface 11 of unit price setting plate 10 so that the unit price of a desired article can be easily set in a BCD (Binary Coded Decimal) code. In the embodiment shown in FIG. 1, sixteen holes 12 in total, each four in the vertical and horizontal rows, are provided so that the unit prices up to four decimal digits can be set as the BCD codes. Numerals 1, 2, 4 and 8 in the vertical direction on unit price setting plate 10 show that holes 12 in horizontal rows corresponding to these numerals respectively denote the positions for $2^0$, $2^1$, $2^2$ and $2^4$. Numerals 1, 2, 3 and 4 in the horizontal direction on unit price setting plate 10 show that holes 12 in vertical rows corresponding to these numerals respectively denote the positions for $10^0$, $10^1$, $10^2$ and $10^3$ (i.e., decimal unit position, tenth position, hundredth position and thousandth position). Holes 12 are not through holes which pass through from rear surface 11 of unit price setting plate 10 to surface 13 but are such that holes 12 corresponding to the unit price can be made into through holes by puncturing with operating rod 14 when the unit price of an article is to be set. FIG. 1(c) shows unit price setting plate 10 which is set to, for example, the unit price $1.38 per 100 grams in the BCD code as described above. (In the figure, black circles are perforated holes 12) Projections 15 and 16 at the centers of both ends of rear 11 of unit price setting plate 10 are provided to form a clearance between adjacent unit price setting plates 10 to prevent the unit price setting plates 10 from closely adhering each other due to static electricity which occurs when said unit price setting plates 10 are stacked and stored in the storing case. Moreover, the names of articles are entered with an erasable ink on blank parts of surfaces 13 of unit price setting plates 10 in which the unit prices of articles are set as described above so that the unit price setting plates 10 can be selected. In FIG. 2, stamp 20 for printing the name of article is of a rectangular type on which the name of article is engraved at the printing side surface of rubber plate 21. Metallic covering member 23 which covers the entire rear surface opposite to the printing side surface of said stamp 20, both end faces and rear end face and is provided with handle 22 which extend from the front end face in the form of ⌐ is fixed to said stamp 20. Two ink supply holes 24 are provided respectively at positions near both side ends of the rear of covering member 23 to supply an ink to rubber plate 21 of stamp 20. Said unit price setting plate 10 is remountably secured at the center of the rear of covering member 23. As a matter of course, the unit price of article engraved in rubber plate 21 of stamp 20 is set in unit price setting plate 10. In FIG. 3, unit price reading device 30 is shown. Unit price reading device 30 comprises rectangular unit price reading plates 31 which are provided respectively corresponding to the lines and rows of holes 12 and fixed in layers to read holes 12 containing BCD codes on unit price setting plate 10. Unit price reading plate 31 is provided with four reading elements 32 (switching parts such as, for example, piezo-electric elements) which are arranged in parallel on one surface of unit price reading plate 31 with the same specified intervals as for holes 12 on unit price setting plate 10. Terminal 33 at one side of each reading element 32 projects from one end side of unit price reading plate 31 to detect the recess of holes 12 on unit price setting plate 10. Terminal 34 at the other end of each reading element 32 is connected to grounding wire 35 which is formed on unit price reading plate 31 by etching. Grounding terminal 36 of grounding wire 35 projects from one end face of unit price reading plate 31 as said terminals 33 of reading elements 32. In FIG. 4, there is shown casing 40 which stores stamps 20 for printing the names of articles on each of which unit price setting plate 10 is mounted, unit price reading device 30 etc. and is open at the bottom. Unit price reading device 30 is fixed and housed in casing 40 so that terminals 33 of said unit price reading elements 32 are positioned below. Then stamps 20 are housed in casing 40 so that holes 12 of unit price setting plate 10 on said stamp 20 are opposed to said terminals 33. In this case, metallic covering member 23 is adapted for attraction by a permanent magnet (not shown) provided in casing 40 so that stamps 20 can be easily taken out from casing 40. Casing 40 is mounted on the other supporting mechanism (not shown) near the printing mechanism (not shown) in the printing device, said printing mechanism comprising a printer so that the unit price of unit price setting plate 10 mounted on stamp 20 can be read and casing 40 can be moved in the vertical direction when stamps 20 are set in the printing device. The other type of stamp 41 has a similar construction to stamp 20 and is housed in casing 40 to be used for printing, for example, a name of store.

The lead wires (not shown) connected to terminals 33 of reading elements 32 and grounding terminal 36 of said unit price reading device 30 are respectively connected to the specified input terminals of the electronic circuit in the electronic scale to transmit a read unit price to the computing device, displaying device and printing device, thus permitting computation, display and printing. As described above, when stamp 20 is attracted and fixed to the stamp mounting position of the printing device, that is, casing 40, unit price reading device 30 immediately reads the unit price set in unit price setting plate 10, the price is computed through various calculations conducted in the electronic scale as described above and displayed on the display device and said casing 40 is automatically or manually moved down to print the name of article etc. on a label while the printing device further prints the read unit price and computed price and weight on said label.

Referring to FIG. 5, the following describes the constitution of the control circuit to set the unit price read by said unit price reading device in the electronic scale. The circuit of the embodiment shown in FIG. 5 is adapted to set the unit price of article in the electronic scale by unit price setting plate 10 as described above and to set the unit price from the key input device provided with the entry key. In the figure, there are shown switching sections S1, S2, S3 and S4 corresponding to unit price reading plates 31 of said unit price reading device 30 to set the decimal unit position, tenth position, hundredth position and thousandth position of the unit price. These switching sections S1 to S4 comprise four switches $SW_1$ to $SW_4$ which open and close in response to four reading elements 32 on unit price setting plates 31. In other words, when unit price reading device 30 reads the unit price set as the BCD code in unit price setting plate 10, corresponding ones of said switches $SW_1$ to $SW_4$ in switching sections $S_1$ to $S_4$ are closed and the output signals are transmitted respectively to OR gates 51, 52, 53 and 54 corresponding to switching sections S1 to S4. The output signals of OR gates 51 to 54 are inputted into OR gate 55 and the output signal of OR gate 55 is inputted into AND gate 56. Accordingly, the read signal of the set unit price is sent to and stored in register 63 for the unit price through OR gate 62 when said AND gate 56 is opened. The unit price stored in register 63 for the unit price is, of course, read out to the computing device, displaying device and printing device etc. when it is required. There is shown said key input device 57. Control device 58 comprises an encoder etc., thereby the key input signal of the unit price set by operating key input device 57 is encoded by control device 58, inputted into AND gate 61, and sent to register 63 for the unit price and stored therein through said AND gate 61 which is then opened and OR gate 62. Control circuit 59 which receives both the output signal from control device 58 and clear signal <C> from key input signal 57 output signals to AND gate 56 through inverter 60 as the control signal for said AND gate 56. In other words, AND gate 56 is closed when the unit price from key input device 57 is set, to prohibit the unit price read by unit price reading device 30 from being inputted into register 63 for the unit price. When the unit price is set by using unit price reading device 30, said AND gate 56 is opened to input and store the unit price signal to be outputted from switching sections S1 to S4 into register 63 for the unit price. The output signal from control circuit 59 is inputted into said AND gate 61 and, only when the unit price is set from key input device 57 as described above, said AND gate 61 is opened to send the key input signal to register 63 for the unit price. When switch 64 is closed, it causes differentiation circuit 65 to generate one pulse signal and said pulse signal to enter the reset terminal of register 63 for the unit price through OR gate 66, to clear the contents of said register 63. Register 63 for the unit price is adapted so that its contents are also cleared by clear signal <C> of the key input device 57 which is inputted similarly through OR gate 66.

The following describes the operation of said first embodiment of the present invention with the constitution as described in the foregoing.

For setting the unit price in the electronic scale by using unit price setting plate 10, said unit price setting plate 10 in which the unit price of a desired article is set is taken out from the storing case and set in the upper central part of covering member 23 for stamp 20 for printing the name of article. Then this stamp 20 is inserted into said casing 40 to oppose unit price reading device 30 which is fixed and housed in advance in casing 40 and is attracted by the magnet. As a result, reading element 32 reads the unit price set in unit price setting plate 10 and corresponding ones of switches $SW_1$ to $SW_4$ of switching sections $S_1$ to $S_4$ shown in FIG. 5 are closed. The output signals from switching sections $S_1$ to $S_4$ are respectively inputted into OR gates 51 to 54 and the output signals from OR gates 51 to 54 are inputted into AND gate 56 through OR gate 55. In this case, there is not the output signal from key input device 57 and there is therefore not the output signal of control circuit 59. Said output signal of control circuit 59 is inputted into AND gate 56 through inverter 60 to open said AND gate 56. Then the read signal from unit price setting plate 10 is inputted and stored into register 63 for the unit price. (In this case, before setting the unit price in the electronic scale, switch 64 should be closed once to output the pulse from differentiation circuit 65 to clear the contents of register 63 for the unit price.) Since AND gate 61 is closed because there is not the input signal from control circuit 59, the key input signal is not transmitted to register 63 for the unit price even though the entry key of key input device 57 is erroneously operated during setting of the unit price from unit price setting plate 10 in the electronic scale. Thus, when an article to be weighed is put on the plate of the electronic scale, the unit price stored in register 63 for the unit price is called out in the computing device, and the price of said article is computed by multiplying the weight by unit price of the article and displayed on the display device. The unit price read by unit price reading device 30 is sent to the printing device to be printed on a label or the like. At this time, casing 40 is automatically or manually moved down to print the name of article on the label or the like. Said computed price and weight are also printed on the label in sequence.

For subsequently setting the unit price of another article from unit price setting plate 10 to the electronic scale, stamp 20 for the preceding article is taken out from casing 40. Unit price setting plate 10 in which the unit price of a next article is taken out from the storing case and mounted on stamp 20 for printing the name of article, stamp 20 is housed in casing 40 to read the unit price of article and to set it in the electronic scale. Subsequent weighing operation of articles and following printing operation of the names, weights, unit prices and prices of articles on labels or the like are completely the same as those described in the foregoing.

For setting the unit price from key input device 57 into the electronic scale, unit price setting plate 10 is not selected and mounted on stamp 20 for printing the name of article and only said stamp 20 is set in casing 40 to permit printing the name of article only. When a desired unit price is inputted from key input device 57, AND gate 61 is opened (AND gate 56 is kept closed) and the unit price is stored in register 63 for the unit price. Subsequent operation of the electronic scale is completely the same as in case of setting the unit price in the electronic scale by means of unit price setting plate 10.

Unit price setting plate 10 in said first embodiment of the present invention is designed to permit setting the unit price up to four decimal digits in a single unit price setting plate. However, the number of digits is not limited and any number of digits is possible. It is also possible to form said unit price setting plate 10 with a plurality of replaceable digital segments and to set the unit price of a subsequent article by replacing said digital segments for some corresponding digits which are to be changed in accordance with the unit price of said subsequent article. It is considered that, as the other unit price setting plate based on the BCD codes, one unit price setting plate which is divided into four parts, for example, respectively for four decimal digits in one direction, each being assigned to the decimal unit position, tenth position, hundredth position and thousandth position, can be perforated at these digit indicating parts in terms of the BCD codes to set the unit price.

In the foregoing description, the unit price set in unit price setting plate 10 is read by detecting whether holes 12 denoting the BCD codes on unit price setting plate 10 are completely opened, that is, the recesses on said unit price setting plate 10. It is also possible to optically read the unit price by photoelectric elements by irradiating a light onto unit price setting plate 10. Furthermore, the unit price is set by perforating unit price setting plate 10 with the BCD codes and can also be set in a magnetic card but the unit price need not always be set by the BCD codes. Instead of setting the unit prices by reading various types of holes, various unit prices are indicated literally in unit price setting plates 10 and the unit prices can be set by directly reading these figures through a character reader.

Moreover, it is more effective for narrow stores to connect a flexible cable to an electronic circuit (unit price decoder) such as, for example, switching sections $S_1$ to $S_4$ shown in FIG. 5 which the unit price signals read by unit price reading device 30 so that such circuit can be installed at a remote place from the electronic scale. The contents of register 63 for the unit price is cleared by opening and closing switch 64 each time the unit price is set in the electronic scale as described in the foregoing but the contents of said register can be automatically cleared.

Referring to FIGS. 6 to 10, the following describes in detail the second embodiment of the present invention. This embodiment is made to realize the third object described before.

In FIGS. 6 to 8, there is shown storing case 71 which can store a number of stamps 72 for printing the names of articles and is of a vertically positioned square column type. Each face of storing case 71 is provided with stamp storing section 73 of 3 rows and 12 stages and entire storing case 71 can therefore store 144 stamps 72 in total. Label 5 which contains the name of article such as, for example, "PORK" which is also contained in stamp 72 to be stored in stamp storing section 73 is pasted up on frame 74 of the front face of storing case 71. Said stamp 72 is generally made of rubber and the name of article is engraved in rubber plate 72a. Moreover, the unit price (for example, $1) of the article is entered with an erasable ink on a plate A which is provided on the front surface of switch mechanism 77 so that a person can read the unit price of article on said plate A when said stamp 72 is stored in stamp storing section 73. Stamp 72 taken out from storing case 71 is used to automatically or manually print the name of article on a receipt etc. as in case of the first embodiment. Switch mechanism 77 are provided in storing section 73 of storing case 71 which stores stamps 72 so that said switch mechanism 77 function when stamp 72 is taken out from storing section 73.

Figure 9:
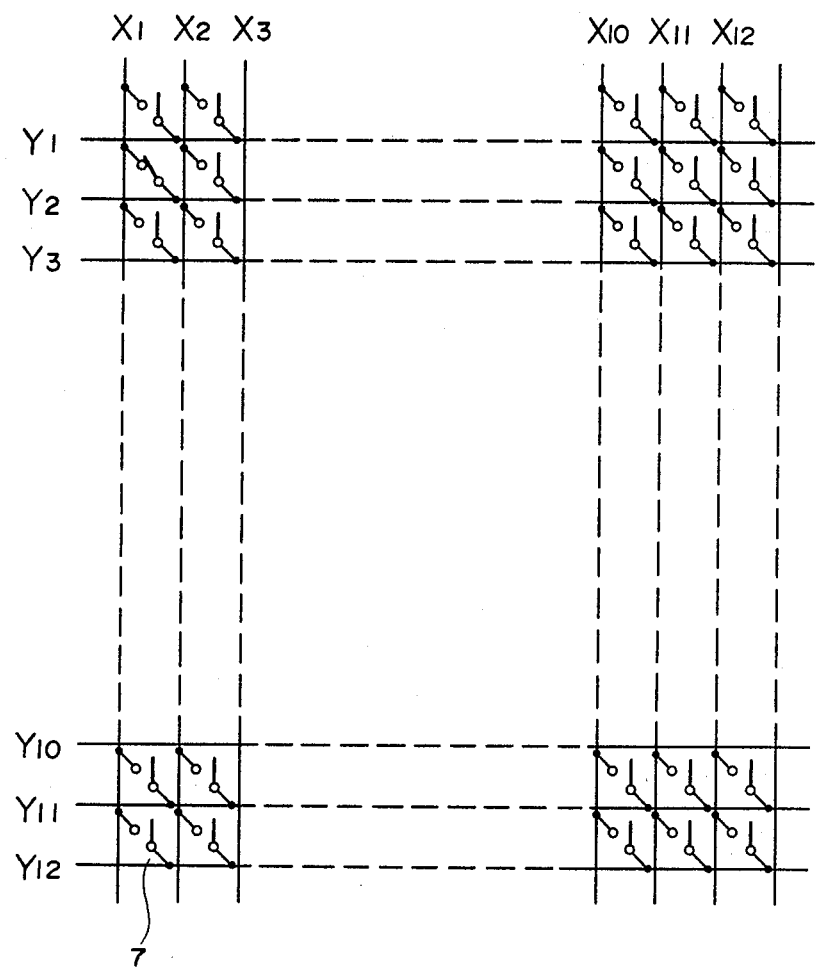
FIG. 9 shows an arrangement of switches provided in said stamp storing section.
Figure 10:
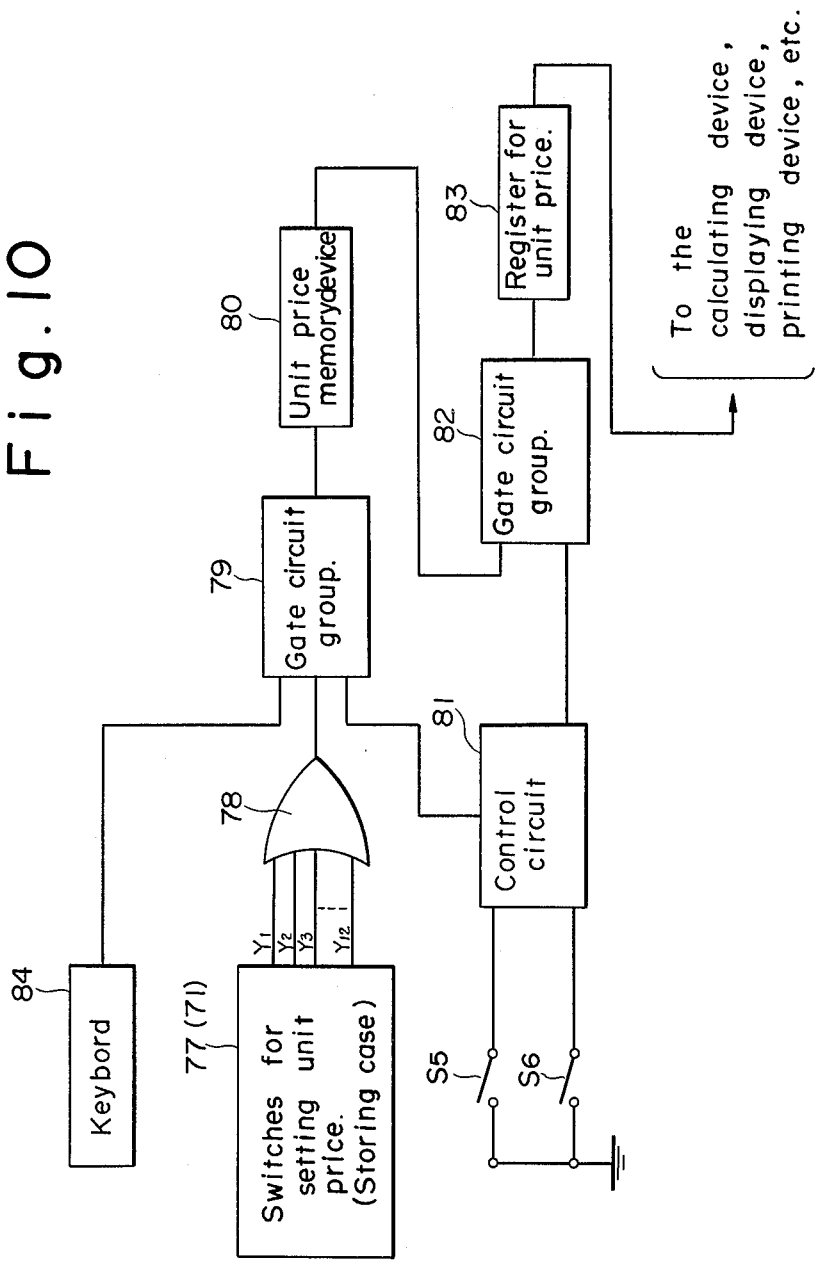
FIG. 10 shows a control circuit diagram of the entire apparatus in accordance with said embodiment.

Accordingly, 144 switches are provided at storing sections 73 in storing case 71. Lead wires X and Y from the input terminals and the output terminals of said switches are connected in a matrix arrangement of 12 lines 12 rows ($X_1$–$X_{12}$, $Y_1$–$Y_{12}$) as shown in FIG. 9. Lead wires $Y_1$ to $Y_{12}$ of the output side of switches are connected to the input terminals of OR gate 78 of the circuit diagram shown in FIG. 10. The output signal of OR gate 78 is inputted into first gate circuit group 79 and the output signal from said first gate circuit group 79 is inputted into unit price memory device 80 comprising a magnetic drum as a command signal of an address in which a desired unit price is stored. Consequently, the unit price signal read out from unit price memory device 80 is sent to second gate circuit group 82 and then to register 83 for the unit price and is stored therein. The unit price stored in register 83 for the unit price is called out when the electronic scale is used for weighing an article and sent to the computing device, displaying device and printing device, thereby the unit price, price and others are displayed on the displaying device and printed on a receipt by the printing device. When the unit price is required to be read out from unit price memory device 80, readout switch $S_5$ is closed, and the output signal of readout switch $S_5$ is sent to control circuit 81 and the readout ready signal is sent from control circuit 81 respectively to first gate circuit group 79 and second gate circuit group 82, thus permitting reading out the unit price. If write-in switch $S_6$ is closed when the unit price in unit price memory device 80 is rewritten, the output signal of said write-in switch $S_6$ is sent to control circuit 81 and the write-in ready signal is sent from control circuit 81 to first gate circuit group 79. At this time, when the unit price is entered through the key-board 84, the unit price is written in said unit price memory device 80.

The descriptions of the operating methods and operations of the embodiments of the present invention are omitted since they can be understood from the detailed description in the foregoing.

In said second embodiment, a corresponding address in unit price memory device 80 is defined by the output signal of switch mechanism 77 provided in storing sections 73. A method can also be considered such that the name of corresponding article is assigned by the output signal of switch mechanism 77 and the unit price of corresponding article is called out from the magnetic drum which stores the unit price of said article by the command signal and is set in the electronic scale. In said second embodiment, unit price memory device 80 comprises the magnetic drum as described above, and it can comprise a magnetic disc or a magnetic tape etc.

As described above, the present invention permits easy and accurate setting of the unit prices of different kinds of articles, vast reduction of the setting time of unit prices and easy operation of the unit price setting apparatus, thus providing various advantages.

What is claimed is:

1. For use in an electronic digital display scale of the kind including:
   (a) a unit price setting section, and
   (b) a printing device adapted to compute and display a price of an article by multiplying the weight of the article by a unit price inserted in a scale, and adapted to print a name, weight, unit price, and price of the article;

the improvement which comprises an automatic unit price setting apparatus incorporating:
   (i) a stamp for printing the name of an article, said stamp having means carrying information appertaining to a unit price for the article
   (ii) detecting means for reading said information means of a stamp presented to it, and passing the unit price to the printing device.

2. An automatic unit price setting apparatus for an electronic digital display scale with a printing device in accordance with claim 1, wherein said automatic unit price setting apparatus comprises unit price setting members which are freely mounted on said stamps and contain the unit prices of articles set therein and a unit price detecting means which is adapted to detect the unit price set in each of said unit price setting members and to input the detected unit price in a register for the unit price, and a unit price of an article is automatically inputted in the scale when said stamp on which said unit price setting member is mounted is set in said unit price detecting means.

3. An automatic unit price setting apparatus for an electric digital display scale with a printing device in accordance with claim 2, wherein said unit price detecting means is provided at a specified position in the vicinity of said stamp of said printing device and the unit price of an article is automatically set in said scale when said stamp on which said unit price setting member is mounted is set in said printing device.

4. An automatic unit price setting apparatus for an electric digital display scale with a printing device in accordance with claim 2, wherein said unit price setting member is made of a thin plate on one surface of which a plurality of non-through holes are provided in a matrix arrangement, the unit price of an article is set in terms of BCD codes by perforating said non-through holes with operating rods and said unit price detecting means comprises a unit price reading device formed by a plurality of reading elements which read a perforated state of said non-through holes provided on said unit price setting member through switching members and a control circuit which sends a unit price signal read by said unit price detecting means to a register for the unit price and to make said register store said unit price signal therein.

5. An automatic unit price setting apparatus for an electronic digital display scale with a printing device in accordance with claim 2, wherein said unit price setting member is made of a magnetic card and the unit price is written in and read out from said magnetic card by a magnetic means.

6. An automatic unit price setting apparatus for an electronic digital display scale with a printing device in accordance with claim 2, wherein said unit price setting member is made of a thin plate on which the unit price is indicated in terms of digits and said unit price is read by a character reader.

7. An automatic unit price setting apparatus for an electronic digital display scale with a printing device in accordance with claim 2, wherein said unit price setting member is adapted to permit replacing of a content in each digit of the unit price to be set in said unit price setting member with another content.

8. An automatic unit price setting apparatus for an electronic digital display scale with a printing device in accordance with claim 4, wherein the unit price set in said unit price setting member is optically read.

9. An automatic unit price setting apparatus for an electronic digital display scale with a printing device in accordance with claim 4, wherein said unit price detecting means is formed by stacking and fixing as many unit price reading plates as the number of lines of said matrix arrangement, said unit price reading plates comprising piezo-electric elements arranged corresponding to the holes in each row of the holes on said unit price setting member.

10. An automatic unit price setting apparatus for an electronic digital display scale with a printing device in accordance with claim 1, wherein said unit price setting apparatus comprises a plurality of said stamps for printing the names of articles, a storing case having a plurality of stamp storing sections which store said stamps and having a signal generating source which generates an address signal in response to a stamp storing section in case a desired stamp is taken out from said stamp storing section, a memory device which memorizes the unit prices of articles indicated on said stamps and a mechanism which reads out the unit price of article indicated on said taken-out stamp from said memory device by receiving said address signal, and the unit price of article is automatically set in the scale by taking out said stamp from the stamp storing section of said storing case.

11. An automatic unit price setting apparatus for an electronic digital display scale with a printing device in accordance with claim 10, wherein said signal generating source comprises a switching member.

12. An automatic unit price setting apparatus for an electronic digital display scale with a printing device in accordance with claim 10, wherein said memory device comprises any one of a magnetic drum, magnetic disc and magnetic tape.

13. An automatic unit price setting apparatus for an electronic digital display scale with a printing device in accordance with claim 10, wherein an address in said memory device which stores the unit price of a desired article is designated by a signal from said signal generating source.

14. An automatic unit price setting apparatus for an electronic digital display scale with a printing device in accordance with claim 10, wherein a signal from said signal generating source is inputted into said memory device as an instruction signal for the name of article.

* * * * *